US010112159B2

(12) United States Patent
Liu

(10) Patent No.: US 10,112,159 B2
(45) Date of Patent: Oct. 30, 2018

(54) BI-DIRECTIONAL BLENDER

(71) Applicant: Jimmy Liu, Jiangmen (CN)

(72) Inventor: Jimmy Liu, Jiangmen (CN)

( * ) Notice: Subject to any disclaimer, the term of this patent is extended or adjusted under 35 U.S.C. 154(b) by 0 days.

(21) Appl. No.: 15/497,586

(22) Filed: Apr. 26, 2017

(65) Prior Publication Data

US 2018/0056254 A1 Mar. 1, 2018

(30) Foreign Application Priority Data

Aug. 31, 2016 (CN) .......................... 2016 1 0768807

(51) Int. Cl.

| | |
|---|---|
| ***B01F 7/16*** | (2006.01) |
| ***A47J 43/046*** | (2006.01) |
| ***A47J 43/08*** | (2006.01) |
| ***B01F 15/00*** | (2006.01) |
| ***A47J 43/07*** | (2006.01) |

(52) U.S. Cl.

CPC ............. *B01F 7/166* (2013.01); *A47J 43/046* (2013.01); *A47J 43/0722* (2013.01); *A47J 43/085* (2013.01); *B01F 7/162* (2013.01); *B01F 15/0048* (2013.01); *B01F 15/00538* (2013.01); *B01F 2015/0011* (2013.01); *B01F 2015/00084* (2013.01); *B01F 2015/00597* (2013.01); *B01F 2215/0014* (2013.01); *B01F 2215/0026* (2013.01)

(58) Field of Classification Search

CPC .. A47J 43/046; A47J 43/0465; A47J 43/0716; A47J 43/0722; B01F 7/166

USPC .......................................................... 366/205

See application file for complete search history.

(56) References Cited

U.S. PATENT DOCUMENTS

| | | | | |
|---|---|---|---|---|
| 6,532,863 B1 * | 3/2003 | Lee | A47J 43/0722 | 241/282.1 |
| 6,709,150 B2 * | 3/2004 | Lin | A47J 43/0716 | 241/199.12 |
| 7,318,375 B2 * | 1/2008 | Huang | A47J 43/0777 | 366/205 |
| 8,056,848 B1 * | 11/2011 | Liang | A47J 43/0722 | 241/282.2 |
| 9,527,052 B2 * | 12/2016 | Gushwa | A47J 43/042 | |
| 9,883,772 B2 * | 2/2018 | Conard | A47J 43/085 | |
| 9,968,223 B2 * | 5/2018 | Behar | A47J 43/085 | |
| 2001/0002892 A1 * | 6/2001 | Karkos, Jr. | A23G 9/045 | 366/274 |
| 2002/0027175 A1 * | 3/2002 | Capp | A47J 43/046 | 241/199.12 |
| 2005/0099884 A1 * | 5/2005 | Lee | A47J 43/0722 | 366/205 |

(Continued)

*Primary Examiner* — Abbas Rashid

(74) *Attorney, Agent, or Firm* — Hunton Andrews Kurth LLP

(57) ABSTRACT

Disclosed a bi-directional blender, comprising a cup and a cap holder rotatably connected with the cup by a threaded flange, wherein the interior of the cup is a cavity in which a first blending blade and a second blending blade are fixedly mounted. In the bi-directional blender of the invention, the cup is internally provided with the first blending blade and the second blending blade, the two sets of blending blades may rotate in opposite directions to form a forward and a reverse crushing structure capable of better crushing all kinds of ingredients, and thus the blender can be used in a juicer and a food processor.

5 Claims, 3 Drawing Sheets

(56) References Cited

U.S. PATENT DOCUMENTS

| | | | | |
|---|---|---|---|---|
| 2009/0109793 | A1* | 4/2009 | Xue | A47J 36/022<br>366/205 |
| 2012/0314533 | A1* | 12/2012 | Wang | A47J 43/046<br>366/292 |
| 2015/0101491 | A1* | 4/2015 | Lin | A47J 27/004<br>99/348 |
| 2015/0117139 | A1* | 4/2015 | Conti | B01F 7/00291<br>366/146 |
| 2015/0117141 | A1* | 4/2015 | Brotzki | B01F 15/0048<br>366/205 |
| 2016/0174770 | A1* | 6/2016 | Lee | A47J 43/0716<br>464/179 |
| 2016/0220071 | A1* | 8/2016 | Hewitt | A47J 43/0727 |
| 2016/0324369 | A1* | 11/2016 | Lee | A47J 43/046 |
| 2016/0331181 | A1* | 11/2016 | Dickson, Jr. | B01F 7/0025 |

* cited by examiner

BI-DIRECTIONAL BLENDER

CROSS-REFERENCE TO RELATED PATENT APPLICATIONS

This patent application claims priority to China Patent Application No. 201610768807.9, filed Aug. 31, 2016, the disclosure of which is incorporated in its entirety.

FIELD OF THE INVENTION

The present invention relates to the technical field of machinery, and especially to a bi-directional blender.

BACKGROUND OF THE INVENTION

A traditional blender is only internally provided with a single blade rotating in one direction and thus can only be used to crush specially-made ingredients, which fails to satisfy the current actual needs of people.

SUMMARY OF THE INVENTION

The present invention aims to provide a bi-directional blender to solve the problem mentioned above in the prior art.

In order to achieve the above object, the present invention provides the following technical solution.

A bi-directional blender comprising a cup and a cup holder. The cup holder is rotatably connected with the cup by a threaded flange. The interior of the cup is a cavity in which a first blending blade and a second blending blade are provided, the first blending blade is fixedly connected with a rotation shaft at one end and is connected with the second blending blade through the rotation shaft. A spacer is arranged between one end of the second blending blade and the rotation shaft and is embedded into an inner wall groove at one end of the second blending blade. The second blending blade at the other end is provided with a first sealing ring which is embedded into an inner wall groove at the other end of the second blending blade. The cup holder is a through cup holder with two open ends and is provided with a first bearing at one end and a bottom cover at the other end. The first bearing is arranged in an inner wall groove at one end of the cup holder. The bottom cover is connected with the cup holder by a screw and a nut, and the bottom cover is provided at one end with a gear fixing rod on which a gear set is arranged. The gear set is provided at one side with a second bearing and a second sealing ring which are embedded into an internal through groove of the cup holder. The cup holder bottom cover is provided at the other end with a blade head which is arranged on a blade holder. The blade holder is arranged in an inner pedestal of an upper base. The upper base is provided at one end with a bump through which the upper base is connected with the base by wedging. The base are provided at two ends with concave grooves which match with the bump. The base is provided at one end with a lower base which is also provided with a bump at one end and is connected with the base through the bump by wedging. An outer surface of one end of the lower base is provided with a decoration ring which is embedded in the groove on the outer surface of the lower base.

In a preferred embodiment, the interior of the base is a cavity in which a switch and a motor are provided, the switch is located above the motor and is electrically connected with the motor by an electrode connector, and the motor is arranged in an inner wall of the cavity of the base through a support.

In a preferred embodiment, one end of the switch is provided with a link spring which is sleeved with the switch at one end and is fixedly connected with a switch link at the other end.

In a preferred embodiment, the other end of the lower base is provided with a bottom cover which is connected with the lower base through a wedge by wedging, and one end of the bottom cover is provided with a sucking disc foot which is embedded in a pedestal groove at one end of the bottom cover.

In a preferred embodiment, the gear set comprises a planetary gear, a center gear and a ring gear.

Compared with the prior art, the present invention has the following beneficial effects that: in the bi-directional blender according to the present invention, the cup is internally provided with the first blending blade and the second blending blade; the two sets of blending blades may rotate in opposite directions to form a forward and a reverse crushing structure capable of better crushing all kinds of ingredients; and the blender can be used in a juicer and a food processor.

DETAILED DESCRIPTION OF THE EMBODIMENTS

A clear and overall description will be made to the technical solution of the embodiments of the present invention below in connection with the accompanying drawings in the embodiments of the present invention. Obviously, some, but not all the embodiments of the present invention are described. Based on the embodiments of the present invention, all other embodiments obtained by an ordinary person skilled in the art without innovative effort should fall within the protection scope of the present invention.

Figure 1:
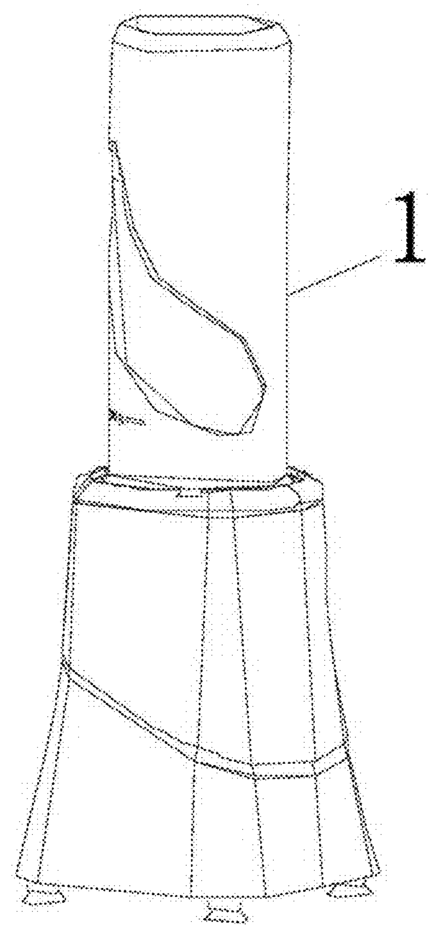
FIG. 1 is an overall schematic structural view of the bi-directional blender according to the invention.
Figure 2:
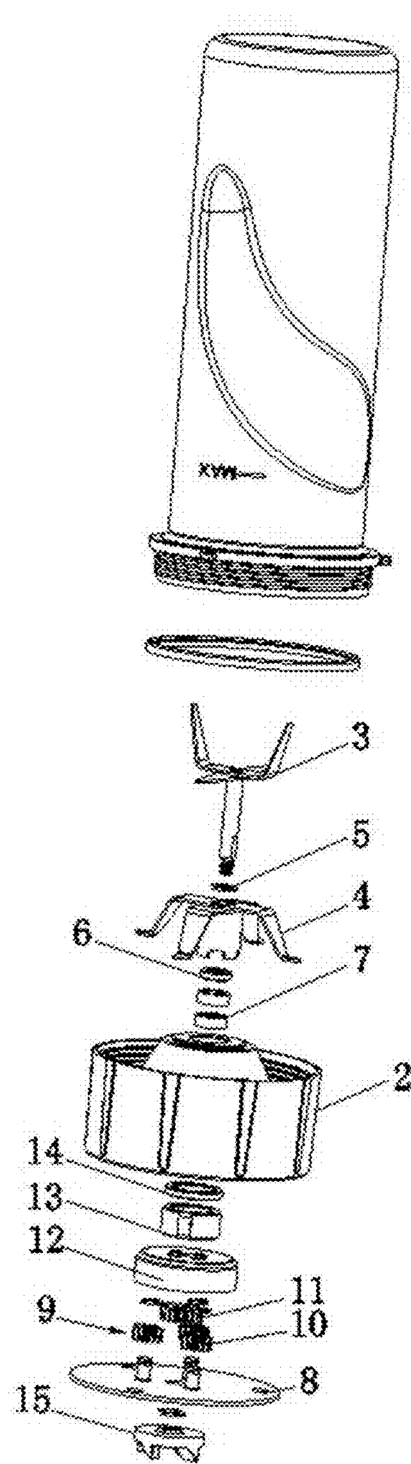
FIG. 2 is an exploded schematic view of the connecting structure of a cup portion of the bi-directional blender according to the invention.
Figure 3:
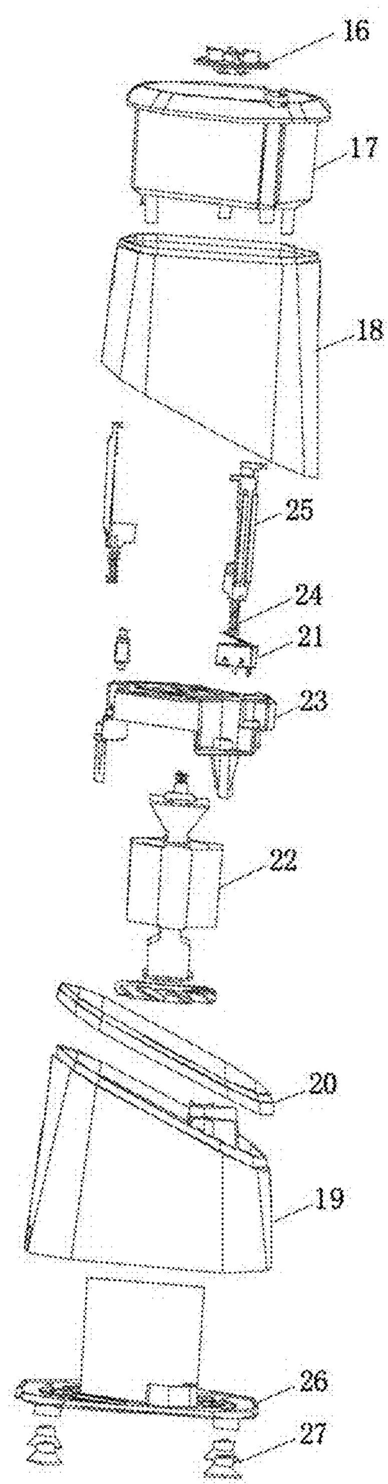
FIG. 3 is an exploded schematic view of the connecting structure of a base portion of the bi-directional blender according to the invention.

Please refer to FIGS. 1 to 3, in an embodiment of the present invention, a bi-directional blender comprising a cup 1 connected with a cup holder 2 fixedly at one end, wherein the cup holder 2 is rotatably connected with the cup 1 by a threaded flange, and the interior of the cup 1 is a cavity in which a first blending blade 3 and a second blending blade 4 are provided. The first blending blade 3 is fixedly connected with a rotation shaft at one end and is fixedly connected with the second blending blade 4 through the rotation shaft. A spacer 5 is arranged between one end of the second blending blade 4 and the rotation shaft and is embedded into an inner wall groove at one end of the second blending blade 4. The second blending blade 4 is provided at the other end with a first sealing ring 6 which is embedded into an inner wall groove at the other end of the second blending blade 4. The spacer 5 cooperates with the first sealing ring 6 to allow the second blending blade 4 to be fixed in position relative to the first blending blade 3 in an axial direction of the rotation shaft, thus the first blending blade 3 can be fixedly connected in terms of position relative to the second blending blade 4 through the connection with the rotation shaft. The cup holder 2 is a through cup holder with two open ends and is provided with a first bearing 7 at one end. The first bearing 7 is hinged in an inner wall groove at one end of the cup holder 2, and in particular, the first bearing 7 can be rotatably arranged in the inner wall groove of the cup holder 2 relative to the cup holder 2. A bottom cover 8 is fixedly mounted to the other end of the cup holder 2 and is fixedly connected with the cup holder 2 by a screw and a nut. A gear fixing rod is fixedly mounted to one end of the cup holder bottom cover 8. A gear set 9 consisting of a planetary gear 10, a center gear 11 and a ring gear 12 is fixedly mounted on the gear fixing rod. The gear set 9 is provided at one side with a second bearing 13 and a second sealing ring 14 which are embedded into an internal through groove of the cup holder 2. The cup holder bottom cover 8 is provided at the other end with a blade head 15 which is fixedly mounted on a blade holder 16 mounted in an inner pedestal of an upper base 17 fixedly. The upper base 17 at one end is provided with a bump through which the upper base 17 is connected with the base 18 by wedging, where the base 18 are provided at two ends with concave grooves which match with the bump. In some cases, the bases are connected with each other via a wedge shaped bump. The interior of the base 18 is a cavity in which a switch 21 and a motor 22 are fixedly mounted. The switch 21 is located above the motor 22 and is electrically connected with the motor 22 by an electrode connector. One end of the switch 21 is fixedly connected with a link spring 24 which is sleeved with the switch 21 at one end and is fixedly connected with a switch link 25 at the other end. In some embodiments the link spring is connected to the switch and in some cases it is connected by a sleeve extending from the switch and holding an outer surface of the link spring The motor 22 is fixedly mounted in an inner wall of the cavity of the base 18 through a support 23, the other end of the base 18 is provided with a lower base 19 which is also provided with a bump at one end and is connected with the base 18 by wedging through the bump. An outer surface of one end of the lower base 19 is provided with a decoration ring 20 which is embedded in a groove on the outer surface of the lower base 19, the lower base 19 is provided at the other end with a bottom cover 26 which is connected with the lower base 19 by wedging through a wedge. The bottom cover 26 is provided at one end with a sucking disc foot 27 which is embedded in a pedestal groove at one end of the bottom cover 26.

In the bi-directional blender according to the present invention, by using the first blending blade 3, the second blending blade 4, the spacer 5, the first sealing ring 6, the first bearing 7, the cup holder bottom cover 8, the gear set 9, the planetary gear 10, the center gear 11, the ring gear 12, the second bearing 13, the second sealing ring 14 and the blade head 15, a planet wheel structure thus formed exhibits the forward and reverse rotation of the blades, which is a breakthrough of the unidirectional rotation of a single blade of the traditional blender, and which enables the ingredients and foods to be better crushed.

In the bi-directional blender according to the present invention, based on the arrangement of the first blending blade 3 and the second blending blade 4, the two sets of blending blades may rotate in opposite directions to form a forward and a reverse crushing structure capable of better crushing all kinds of ingredients, so that they can be used in a juicer and a food processor.

In conclusion, the bi-directional blender of the present invention is simple in structure and convenient in operation, is applicable to a juicer or a food processor, and fully meets the needs of people for crushing ingredients.

It is obvious to those skilled in the art that the present invention is not limited to the details of the above exemplary embodiments and may be embodied in other specific forms without departing from the spirit or essential characteristics thereof. The present embodiments are therefore to be considered in all respects as illustrative and not restrictive, the scope of the invention being defined by the appended claims rather than by the foregoing description, and all changes which come within the meaning and range of equivalency of the claims are therefore intended to be embraced therein. Any reference numbers in the claims shall not be construed as limiting the claim concerned.

In addition, it will be appreciated that although the specification is described according to the embodiments, it does not mean that each embodiment includes only one separate technical solution, and such description is made merely for clarity. Those skilled in the art should regard the specification as a whole, and technical solutions in respective embodiments may be combined properly so as to create other embodiments readily appreciated by those skilled in the art.

REFERENCE NUMERAL LIST

1 cup
2 cup holder
3 first blending blade
4 second blending blade
5 spacer
6 first sealing ring
7 first bearing
8 cup holder bottom cover
9 gear set
10 planetary gear
11 center gear
12 ring gear
13 second bearing
14 second sealing ring
15 blade head
16 blade holder
17 upper base
18 base
19 lower base
20 decoration ring
21 switch
22 motor
23 support
24 link spring
25 switch link
26 bottom cover
27 sucking disc foot

The invention claimed is:

1. A bi-directional blender, comprising a cup, a cup holder rotatably connected with the cup at one end by a threaded flange, an upper base for receiving the cup holder, and a base connected with the upper base by wedging, wherein a first blending blade and a second blending blade are provided within an interior cavity of the cup, the first blending blade is connected with the second blending blade through a rotation shaft fixedly connected at one end of the first blending blade, wherein a spacer is arranged between one end of the second blending blade and the rotation shaft and is embedded into an inner wall groove at one end of the second blending blade, such that the second blending blade is provided at its other end with a first sealing ring which is embedded into an inner wall groove at the other end of the second blending blade, and wherein:

the cup holder is a through cup holder with two open ends and is provided with a first bearing at one end and a cup holder bottom cover at its other end; the first bearing is arranged in an inner wall groove at one end of the cup holder; the bottom cover is connected with the cup holder by a screw and a nut; the bottom cover is provided at one end with a gear fixing rod on which a gear set is arranged; the gear set is provided at one side with a second bearing and a second sealing ring which are embedded into an internal through groove of the cup holder; the bottom cover is provided at its other end with a blade head which is arranged on a blade holder; the blade holder is arranged in an inner pedestal of an upper base; the upper base is provided at one end with a bump through which the upper base is connected with the base by wedging; the base is provided at two ends with concave grooves which match with the bump; the base is provided at one end with a lower base having a groove on its outer surface which is also provided at one end with a bump and is connected with the base through the bump by wedging; and an outer surface of one end of the lower base is provided with a decoration ring which is embedded in the groove on the outer surface of the lower base.

2. The bi-directional blender according to claim 1, wherein a switch and a motor are provided within an interior cavity of the base, the switch is located above the motor and is electrically connected with the motor by an electrode connector, and the motor is arranged in an inner wall of the cavity of the base through a support.

3. The bi-directional blender according to claim 2, wherein the switch is provided at one end with a link spring which is sleeved with the switch at one end and is fixedly connected with a switch link at its other end.

4. The bi-directional blender according to claim 1, wherein the other end of the lower base is provided with a bottom cover which is connected with the lower base through a wedge by wedging, and the bottom cover is provided at one end with a sucking disc foot which is embedded in a pedestal groove at one end of the bottom cover.

5. The bi-directional blender according to claim 1, wherein the gear set includes a planetary gear, a center gear and a ring gear.

* * * * *